(12) United States Patent
Ibacoglu et al.

(10) Patent No.: US 12,643,654 B2
(45) Date of Patent: Jun. 2, 2026

(54) TRANSMISSION SYSTEM

(71) Applicant: Tusas—Turk Havacilik Ve Uzay Sanayii Anonim Sirketi, Kahramankazan (TR)

(72) Inventors: Hasan Ibacoglu, Kahramankazan (TR); Burhan Sahin, Kahramankazan (TR)

(73) Assignee: Tusas-Turk Havacilik Ve Uzay Sanayii Anonim Sirketi, Ankara (TR)

( * ) Notice: Subject to any disclaimer, the term of this patent is extended or adjusted under 35 U.S.C. 154(b) by 0 days.

(21) Appl. No.: 19/141,304

(22) PCT Filed: Nov. 14, 2023

(86) PCT No.: PCT/TR2023/051323
§ 371 (c)(1),
(2) Date: Jun. 19, 2025

(87) PCT Pub. No.: WO2024/136796
PCT Pub. Date: Jun. 27, 2024

(65) Prior Publication Data
US 2025/0382052 A1     Dec. 18, 2025

(51) Int. Cl.
| | |
|---|---|
| *B64C 27/14* | (2006.01) |
| *B64C 27/24* | (2006.01) |
| *B64D 35/04* | (2006.01) |
| *B64C 27/82* | (2006.01) |

(52) U.S. Cl.
CPC .............. *B64C 27/14* (2013.01); *B64C 27/24* (2013.01); *B64D 35/04* (2013.01); *B64C 2027/8236* (2013.01)

(58) Field of Classification Search
CPC . B64C 27/14; B64C 27/24; B64C 2027/8236; B64C 2027/8245; B64C 27/12; B64D 35/04
See application file for complete search history.

(56) References Cited

U.S. PATENT DOCUMENTS

2020/0070996 A1 * 3/2020 Hefner .................... B64C 27/82

* cited by examiner

*Primary Examiner* — Valentina Xavier

(57) ABSTRACT

The present invention relates to a body (2) on an air vehicle; at least one engine (3) that provides a required power for the flight of the body (2); at least one rotor (4) connected to the engine (3) and enabling blades of the air vehicle to rotate; at least one shaft (5) that transmits the movement of the engine (3) to the rotor (4); at least a first transfer element (6) located on the shaft (5); at least a first spindle (7) transmitting the engine (3) drive to the propulsion system (P) and/or anti-torque system (T) that provide movement of the air vehicle; a first spindle element (8) located on the first spindle (7) and allowing the movement of the first spindle (7); an intermediate transfer element (9) that transmits the engine (3) drive from the first transfer element (6) to the first spindle element (8) and rotor (4).

12 Claims, 6 Drawing Sheets

TRANSMISSION SYSTEM

RELATED APPLICATIONS

This application is a National Phase of PCT Patent Application No. PCT/TR2023/051323 having International filing date of Nov. 14, 2023, which claims the benefit of priority of Turkey Patent Application No. 2022/020019 filed on Dec. 22, 2022. The contents of the above applications are all incorporated by reference as if fully set forth herein in their entirety.

FIELD AND BACKGROUND OF THE INVENTION

This invention relates to a transmission system developed to control the transport, thrust and anti-torque systems in an air vehicle.

A multi-mode air vehicle, such as a hybrid or combined air vehicle, that can perform multiple missions during a flight, e.g. a helicopter mode and an aircraft mode, are suitable for flight and wide mission capabilities. The reason for the development of multi-mode air vehicles is that they can take off and land vertically like helicopters, and thus they can be used in rough or small areas. In addition, vehicles with multiple flight modes can operate in aircraft mode to reach high speeds during flight. In the state of the art, there are various studies on transmission systems developed for switching from helicopter mode to aircraft mode.

US2020/0070996A1, which is included in the known-state of the art, discloses air vehicle propulsion systems and mechanisms. Said system uses clutch and gear systems to operate the engine and rotor, engine and thrust propeller, or engine and anti-torque system individually.

U.S. Pat. No. 2,698,147A, which is included in the known-state of the art, discloses a hybrid aircraft equipped with both a lifting rotor for hovering and low-speed operations, and fixed wings for high-speed forward flight. The document describes a coordinated control and transmission system that allows gradual transfer of lift and propulsion between the rotor and propeller systems, enhancing flight stability and eliminating the need for complex reconfiguration during mode transitions.

A transmission system according to the present invention enables propulsion system, rotor system and anti-torque system of an air vehicle to operate together or independently.

SUMMARY OF THE INVENTION

Another object of the invention is to provide a system to enable switching between modes in an air vehicle with a plurality of flight modes, such as a helicopter mode and an aircraft mode.

A transmission system realized to achieve the object of the invention, which is defined in the first claim and other claims dependent thereon, comprises a body on an air vehicle; at least one engine that provides the necessary force for the body to move; a rotor that produces carrying force when actuated by the engine; at least one shaft carrying the movement of the engine to the rotor; at least a first transfer element located at one end of the shaft; a propulsion system that provides forward movement of the air vehicle by producing thrust force for the air vehicle and/or at least a first spindle which provides aircraft stabilization by producing anti-torque, and transmits the engine drive to the anti-torque system; a first spindle element located at one end of the first spindle and moving the first spindle when triggered;

an intermediate transfer element that transfers the engine drive from the first transfer element to the first spindle element and the rotor.

The transmission system according to the invention comprises a second spindle which moves independently of the first spindle, and extends along a direction that the first shaft extends, in an opening within the first spindle or on the first spindle so as to surround the first shaft, with a distance between the second spindle and the first spindle; a second spindle element located at one end of the second spindle; a transfer equipment that transfers the movement input from the first spindle element to the second spindle element, thereby allowing the second spindle to rotate; the first spindle and the second spindle, one of which transmits the engine drive to the propulsion system, while the other one transmits the engine drive to the anti-torque system.

In an embodiment of the invention, the transmission system comprises a clutch which separates the first spindle and the second spindle on the body into a first section and a second section, such that a distance is provided between the first spindle and the second spindle, without a direct contact with each other, wherein the clutch moves between the first section and the second section to provide or remove the contact between the first spindle and the second spindle; a closed position (C) in which the clutch provides movement transfer between the first section and the second section; an open position (O) in which the clutch is slid from the closed position (C) and the contact between first section and second sections of the first spindle or the second spindle is removed to prevent the movement transfer; a first actuator that allows the clutch to be slid between the open position (O) and the closed position (C).

In an embodiment of the invention, the transmission system comprises an anti-torque system in which the second spindle transfers the engine drive and produces anti-torque for the stabilization of the air vehicle; the propulsion system in which the first spindle transfers the engine drive and produces thrust to the air vehicle; the clutch slid from the closed position (C) to the open position (O) by the first actuator while the anti-torque system of the air vehicle is operating, thus preventing the movement transfer between the first section and the second section and stopping the anti-torque system of the air vehicle.

In an embodiment of the invention, the transmission system comprises a rotor shaft with the intermediate transfer element thereon, which transmits movement input to the rotor; a rotor clutch located on the rotor shaft and separating the rotor shaft into a first shaft section and a second shaft section, so as to be located in a sliding manner between the first shaft section and the second shaft section; an active position (A) in which the rotor clutch contacts the first shaft section and the second shaft section and provides movement transfer; a passive position (K) in which the rotor clutch is slid on the rotor shaft, breaking the contact between the first shaft section and the second shaft section and stopping the rotor; a second actuator that allows the rotor clutch to slide on rotor shaft.

In an embodiment of the invention, the transmission system comprises at least one spring on the rotor shaft, which stores energy by shortening in length while the second actuator slides the rotor clutch from the active position (A) to the passive position (K), wherein when the force applied by the second actuator disappears, the spring applies an opposite force to the rotor clutch, thereby sliding the rotor clutch from the passive position (K) to the active position (A).

In an embodiment of the invention, the transmission system comprises a plurality of gears located opposite each other in contact with the first spindle element and the second spindle element, transmitting the drive received from the first spindle element to the second spindle, and having different sizes to allow the first spindle and the second spindle to rotate at different speeds.

In an embodiment of the invention, the transmission system comprises the control unit triggering the first actuator or the second actuator that trigger the clutch and rotor clutch, depending on environmental conditions or upon a user input, thus allowing switching between open position (O) and closed position (C) or active position (A) and passive position (K).

In an embodiment of the invention, the transmission system comprises a helicopter mode (H) in which the body performs tasks such as vertical take-off and landing, autorotation, or hovering; the anti-torque system on the body that creates anti-torque when the body is in helicopter mode (H); an aircraft mode in which the rotor clutch is placed in the active position (A) to prevent movement input to the rotor, the rotor is stopped and the blades are used as fixed wings, as well as placing the clutch in the open position (O) to prevent the anti-torque system from operating; the propulsion system that provides thrust for the movement of the body thanks to the clutch provided in the closed position (C) when the body is in aircraft mode.

In an embodiment of the invention, the transmission system comprises a plurality of protrusions extending outward from the first spindle and/or the second spindle; and a plurality of recesses located on the clutch so as to be opposite the protrusions, and in which the protrusions slide.

In an embodiment of the invention, the transmission system comprises the clutch located in closed mode (C) when the body is in helicopter mode, such that the first spindle transmits engine drive to the propulsion system.

In an embodiment of the invention, the transmission system comprises the transfer equipment consisting of a continuously variable transmission system.

In an embodiment of the invention, the transmission system comprises:

when the body is in helicopter mode:
   the first transfer element that transmits the drive received from the engine to the intermediate transfer element, the rotor clutch which is in the active position (A), thus transmitting the engine drive transmitted by the intermediate transfer element to the rotor,—the rotor, first spindle and second spindle that are rotated by the drive transmitted from the intermediate transfer element,
   the first spindle and the second spindle, which transmit the drive from the engine to the propulsion system and anti-torque system,
   the closed position (C) in which the clutch is moved by the first actuator and the propulsion system is operated according to the user's input together with the anti-torque system, when the body is in aircraft mode:
   the rotor clutch moved by the second actuator to be brought to the passive position (K), thereby allowing the engine drive to the rotor to be cut off,
   the clutch moved by the first actuator and brought to the open position (O), in which only the propulsion system operates.

BRIEF DESCRIPTION OF THE SEVERAL VIEWS OF THE DRAWING(S)

The transmission system comprises realized to achieve the object of the present invention is illustrated in the attached drawings, in which.

DESCRIPTION OF SPECIFIC EMBODIMENTS OF THE INVENTION

Figure 1:
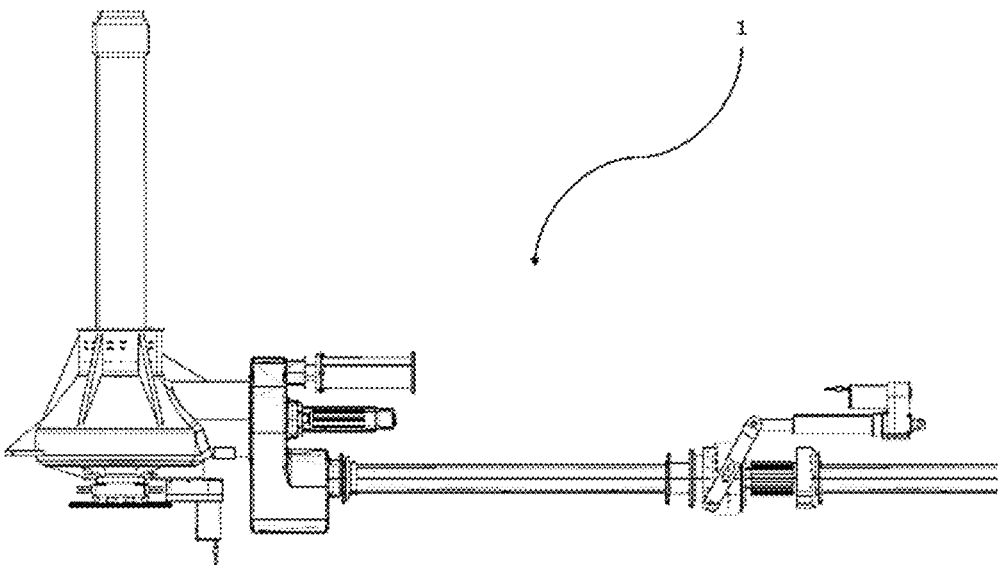
FIG. 1 is a side view of the transmission system.

All the parts illustrated in figures are individually assigned a reference numeral and the corresponding terms of these numbers are listed below:

1. Transmission System
2. Body
3. Engine
4. Rotor
5. Shaft
6. First Transfer Element
7. First Spindle
8. First Spindle Element
9. Intermediate Transfer Element
10. Second Spindle
11. Second Spindle Element
12. Transfer Equipment
13. Clutch
14. First Actuator
15. Rotor Shaft
16. Rotor Clutch
17. Second Actuator
18. Spring
19. Gear
20. Control Unit
21. Protrusion
22. Recess
(T) Anti-torque System
(P) Propulsion System
(F) First Section
(S) Second Section
(C) Closed Position
(O) Open position
(K) Passive Position
(A) Active Position
(B) First Spindle Section
(M) Second Spindle Section The transmission system (1) comprises a body (2) on an air vehicle; at least one engine (3) that provides a required power for the flight of the body (2); at least one rotor (4) connected to the engine (3) and enabling blades of the air vehicle to rotate; at least one shaft (5) that transmits the movement of the engine (3) to the rotor (4); at least a first transfer element (6) located on the shaft (5); at least a first spindle (7) transmitting the engine (3) drive to the propulsion system (P) and/or anti-torque system (T) that provide movement of the air vehicle; a first spindle element (8)

located on the first spindle (7) and allowing the movement of the first spindle (7); an intermediate transfer element (9) that transmits the engine (3) drive from the first transfer element (6) to the first spindle element (8) and rotor (4).

Figure 2:
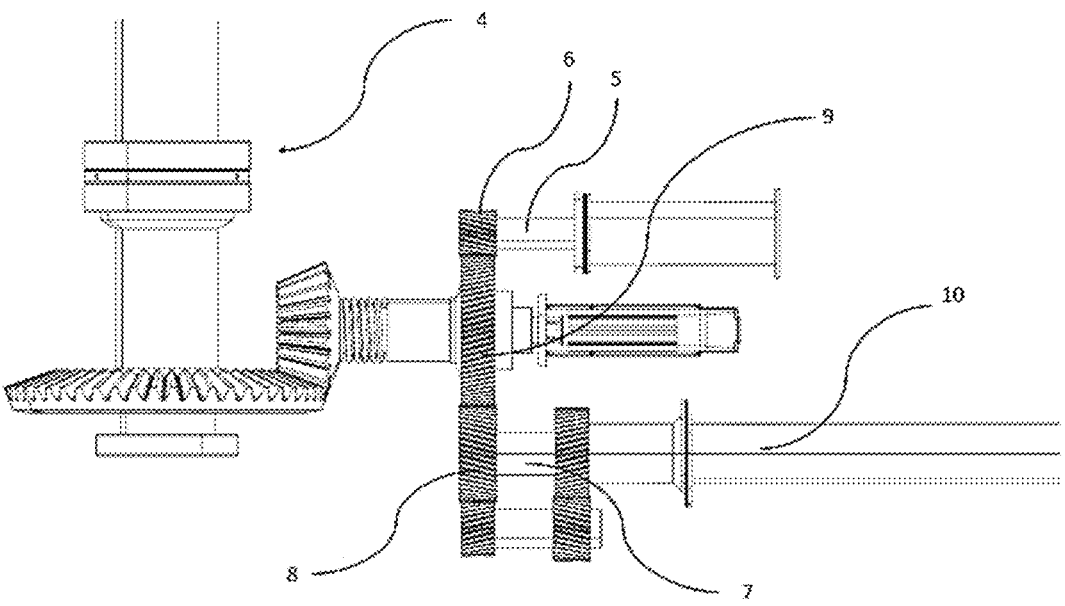
FIG. 2 is a side view of the rotor, shaft, first spindle and second spindle.

The air vehicle transmission system (1) according to the invention comprises a second spindle (10) extending along the direction that the first spindle (7) extends, wherein the second spindle (10) is located in the first spindle (7), or on the first spindle (7) to surround the first spindle (7), and rotates around its own axis independently of the first spindle (7); a second spindle element (11) located on the second spindle (10); a transfer equipment (12) that allows the second spindle (10) to rotate when the first spindle element (8) triggers the second spindle element (11); the first spindle (7) and second spindle (10), one of which drives the propulsion system (P) while the other drives the anti-torque system (T) (FIG. 1, FIG. 2).

Figure 9:
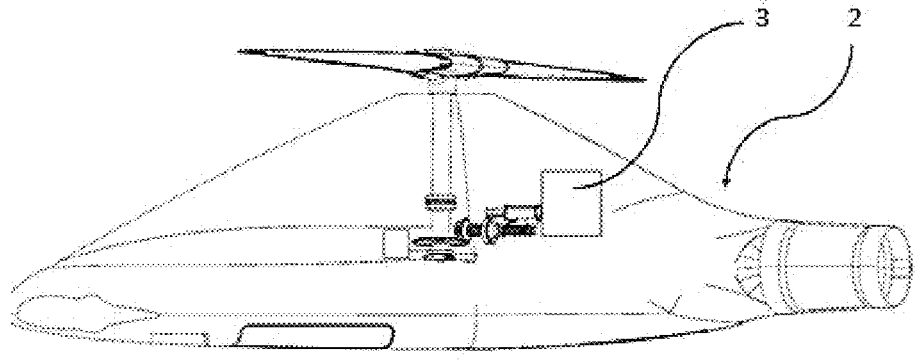
FIG. 9 is a perspective view of the body.

The shaft (5) transmits the drive from the engine (3) to the first transfer element (6), so that the intermediate transfer element (9) is triggered. The movement input on the intermediate transfer element (9) is transferred to the rotor (4) and to the first spindle (7) via the first spindle element (8), thus triggering other systems (FIG. 9).

The second spindle (10) extends on or within the first spindle (7) in the same direction as the first spindle (7). Thanks to the engine (3) drive received from the transfer element (9), the second spindle element (11) located on the second shaft (10) enables the propulsion system (P) and anti-torque system (T) to be triggered, together with the first spindle (7). Thanks to the second spindle (10) extending on or within the first spindle (7), a transmission system (1) that occupies less space on the air vehicle, is provided.

Figure 3:
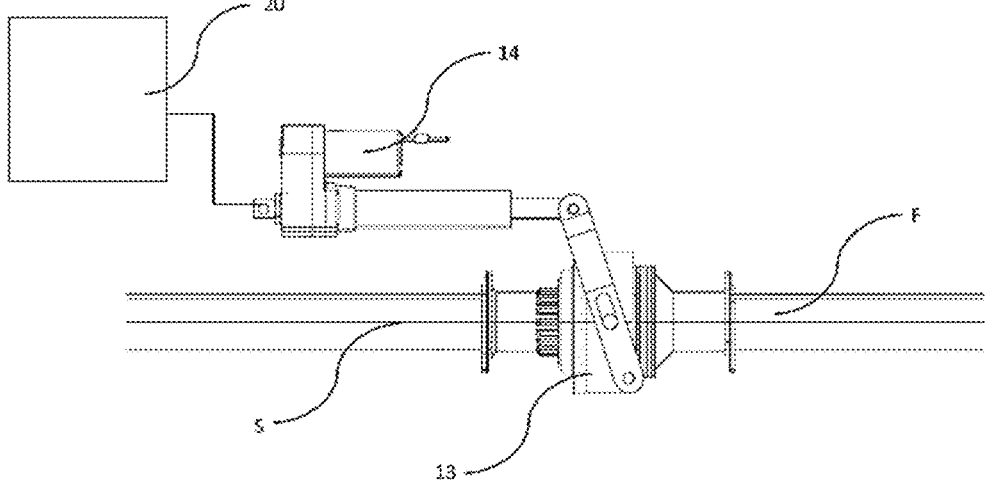
FIG. 3 is a side view of the closed position (C).
Figure 4:
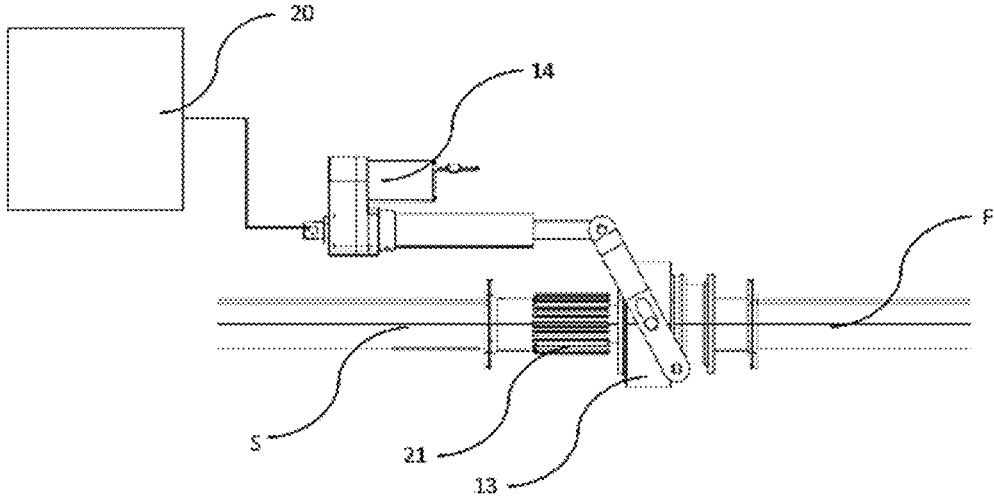
FIG. 4 is a side view of the open position (O).

In an embodiment of the invention, the transmission system (1) comprises at least one clutch (13) on the body (2), which divides the first spindle (7) and the second spindle (10) as a first section (F) and a second section (S), so as to be movable between the first section (F) and the second section (S); a closed position (C) in which the clutch (13) is located in connection with the first section (F) and the second section (S) and allows movement transfer from the first section (F) to the second section (S); an open position (O) in which the clutch (13) is moved from the closed position (C) and the connection between the first section (F) and the second section (S) is broken; at least a first actuator (14) that moves the clutch (13) between the closed position (C) and the open position (O). Thanks to the clutch (13) moved between the open position (O) and closed position (C) by the first actuator (14), the first spindle (7) and second spindle (10) can be controlled to transfer the drive from the engine (3) to the propulsion system (P) or anti-torque system (T). In this way, it is possible to provide anti-torque or thrust to the air vehicle according to different operating conditions (FIG. 3, FIG. 4).

Figure 10:
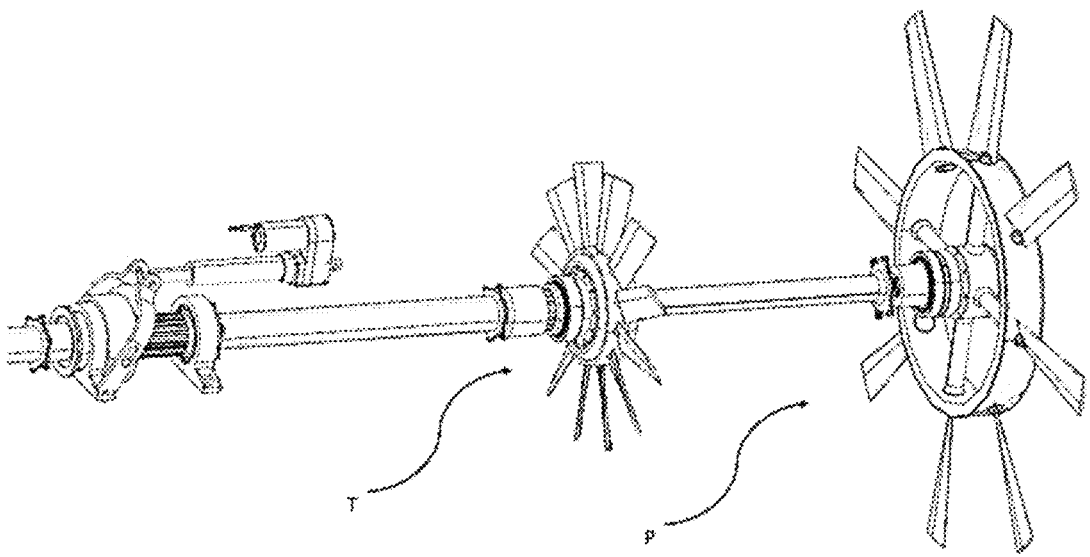
FIG. 10 is a perspective view of the anti-torque and propulsion system.

In an embodiment of the invention, the transmission system (1) comprises the anti-torque system (T) for producing anti-torque to the air vehicle for the stability of the air vehicle, to which the second spindle (10) transfers the movement from the engine (3); the propulsion system (P) for providing thrust to the air vehicle, to which the first spindle (7) transfers the movement from the engine (3); the clutch (13) which moves from the closed position (C) to the open position (O) via the first actuator (14), thus preventing the drive to the anti-torque system (T) of the air vehicle to stop the anti-torque system (T) (FIG. 10).

Figure 5:
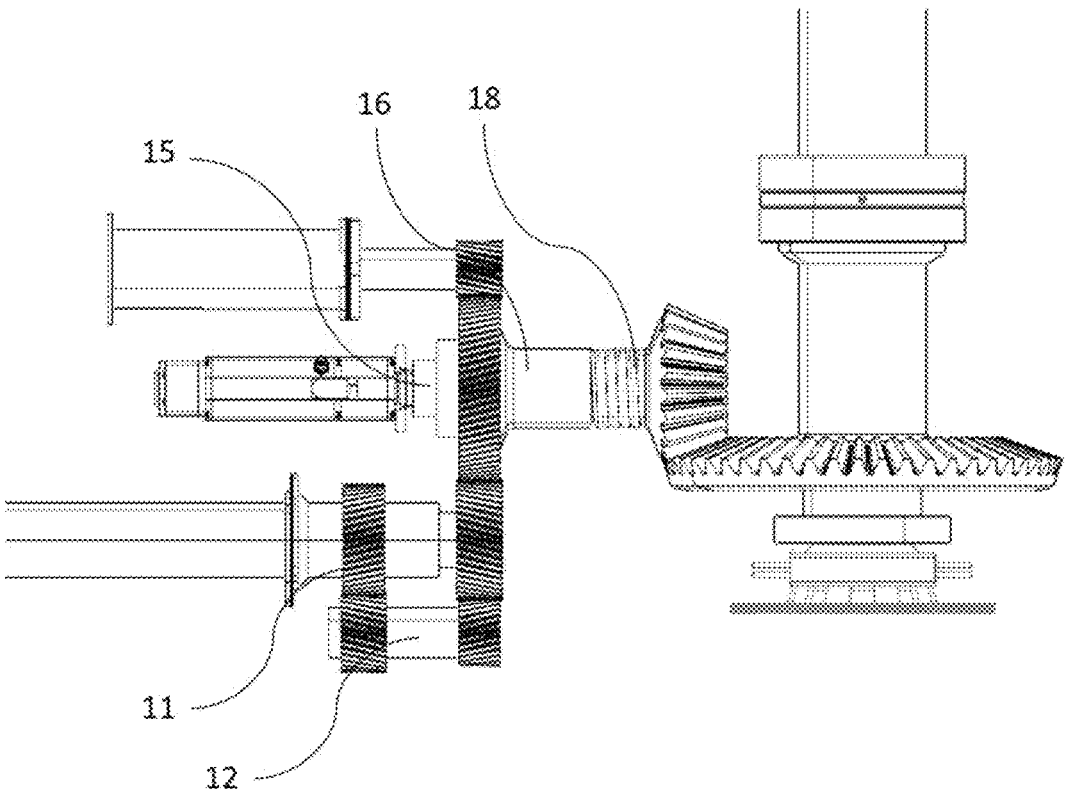
FIG. 5 is a side view of the active position (A).

In an embodiment of the invention, the transmission system (1) comprises a rotor shaft (15) that transfers movement to the rotor (4), with the intermediate transmission element (9) at one end thereof; a rotor clutch (16) on the rotor shaft (15), which divides the rotor shaft (15) as a first shaft section (B) and a second shaft section (M), so as to be movable between the first shaft section (B) and the second shaft section (M); an active position (A) in which the rotor clutch (16) is located in connection with the first shaft section (B) and the second shaft section (M) and provides movement transfer from the first shaft section (B) to the second shaft section (M), thereby moving the rotor (4); a passive position (K) in which the rotor clutch (16) is moved from the active position (A), and connection between the first shaft section (B) and the second shaft section (M) is broken to stop the movement of the rotor (4); at least a second actuator (17) that moves the rotor clutch (16) between active position (A) and passive position (K). By means of the rotor clutch (16) movable between the passive position (K) and active position (A) on the rotor shaft (15), the drive of the engine (3) transmitted by the rotor shaft (15) to the rotor (4) is cut off, so that the rotor (4) is stopped or started according to the operating conditions of the air vehicle (FIG. 5).

In an embodiment of the invention, the transmission system (1) comprises at least one spring (18) on the rotor shaft (15), which is compressed when the second actuator (17) moves the rotor clutch (16) from the active position (A) to the passive position (K) on the rotor shaft (15), wherein when the spring (18) compensates the force of the second actuator (17), it applies a force to the rotor clutch (16) to move the rotor clutch (16) from the passive position (K) to the active position (A). Thanks to the spring (18) located on the rotor shaft (15), when the load applied to the rotor clutch (16) by the second actuator (17) is removed, the rotor clutch (16) is enabled to move from the passive position (K) to the active position (A).

In an embodiment of the invention, the transmission system (1) comprises a plurality of gears (19) located opposite the first spindle element (8) and the second spindle element (11), transmitting the movement input received from the first spindle element (8) to the second spindle (10), and allowing the first spindle (7) and the second spindle (10) to rotate at different speeds thanks to having different transfer ratios. Thanks to achieving different transfer ratios by a plurality of gears (19), rotational speed of the first spindle (7) and the second spindle (10) provided to the propulsion system (P) and anti-torque system (T) can be changed according to the flight conditions of the air vehicle.

Figure 6:
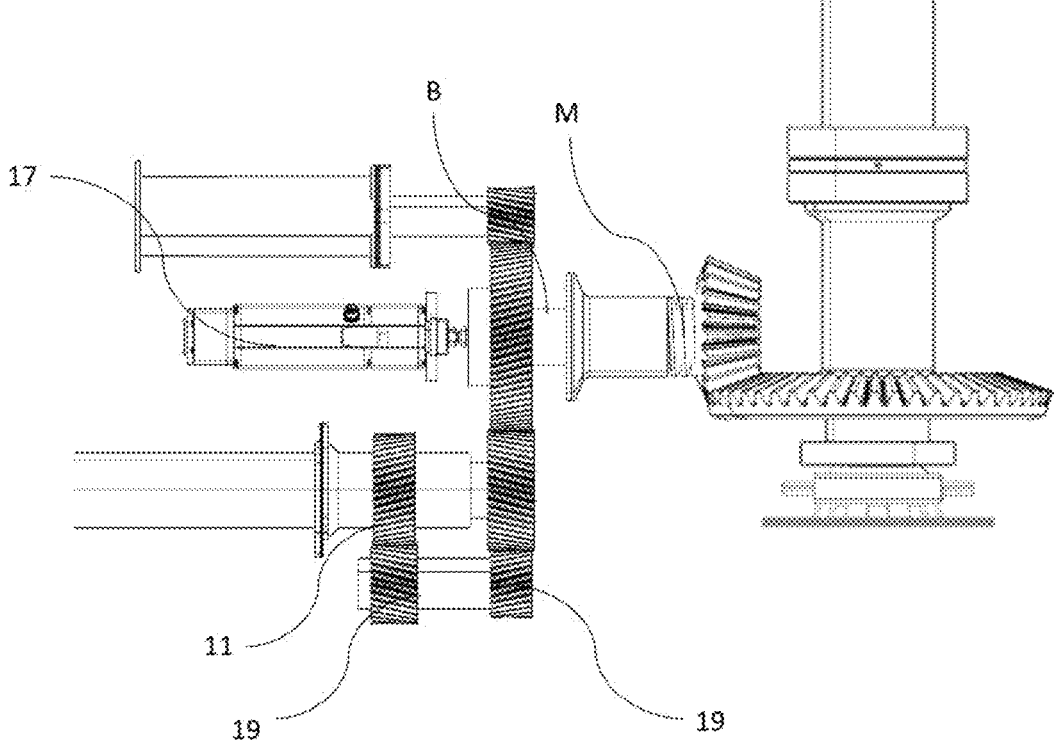
FIG. 6 is a side view of the passive position (K).
Figure 7:
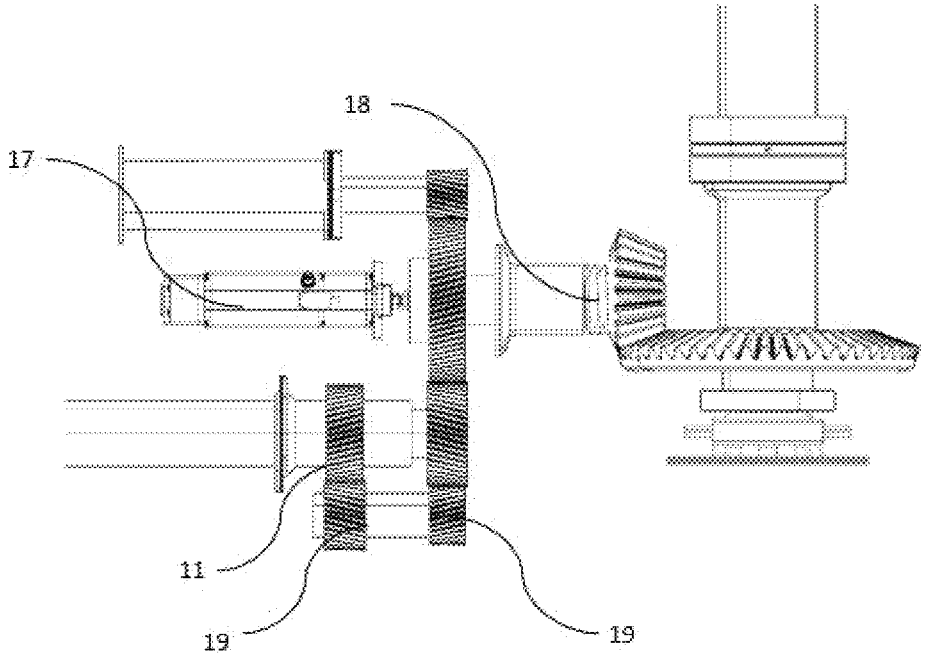
FIG. 7 is a side view of the second actuator and gears.

In an embodiment of the invention, the transmission system (1) comprises a control unit (20) which automatically triggers the first actuator (14) and/or second actuator (17) according to a user input or to the flight conditions of the air vehicle, thereby enabling the clutch (13) and/or the rotor clutch (16) to move between the open position (O) and the closed position (C) or between the passive position (K) and the active position (A). Thanks to the control unit (20), the propulsion system (P), anti-torque system (T) or rotor (4) can be stopped by moving the clutch (13) and/or rotor clutch (16) according to the sensors on the air vehicle or to a user input (FIG. 6, FIG. 7).

In an embodiment of the invention, the transmission system (1) comprises a helicopter mode in which the body (2) performs tasks such as vertical take-off and landing, autorotation or hovering; the anti-torque system (T) on the body (2), which creates anti-torque when the body (2) is in helicopter mode; an aircraft mode in which the rotor clutch (16) is brought to the active position (A) to prevent movement input to the rotor (4), the rotor (4) is stopped and the blades are used as fixed wings, as well as placing the clutch

(13) in the open position (O) to prevent the anti-torque system (T) from operating; the propulsion system (P) that provides thrust for the movement of the body (2) when the body (2) is in aircraft mode. Thanks to the first actuator (14) and second actuator (17) of the air vehicle, the clutch (13) and rotor clutch (16) are moved such that the movements of the propulsion system (P), anti-torque system (T) and rotor (4) are controlled to change the flight modes of the air vehicle.

Figure 8:
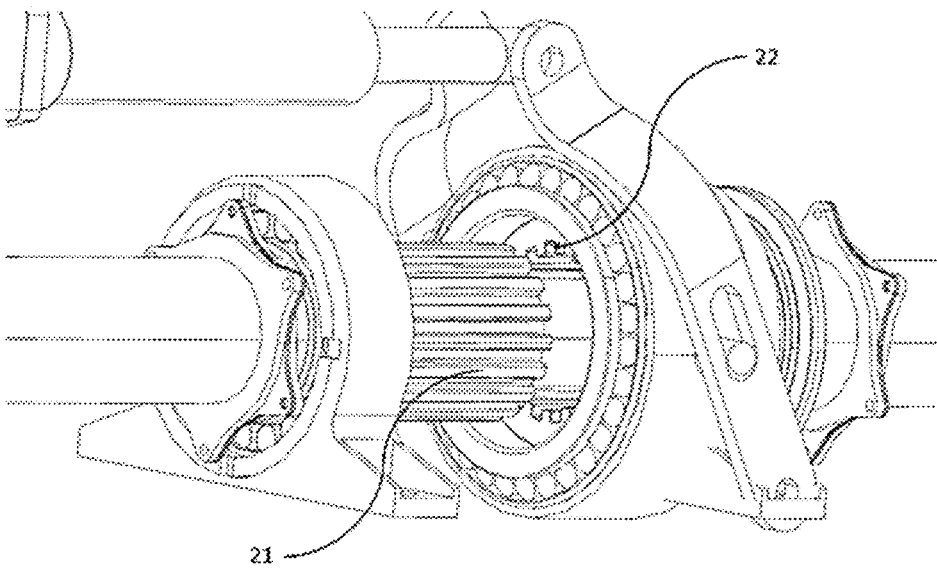
FIG. 8 is a perspective view of the recess and protrusion.

In an embodiment of the invention, the transmission system (1) comprises a plurality of protrusions (21) located on the first spindle (7) and/or the second spindle (10); a plurality of recesses (22) located on the clutch (13) so as to be form-compatible with the protrusions (21), wherein the recesses (22) allow the clutch (13) to slide on the protrusions (21) and thus to be located between the open position (O) and the closed position (C) (FIG. 8).

In an embodiment of the invention, the transmission system (1) comprises the clutch (13) which is in the closed position (C) when the body (2) is in helicopter mode, and enables the propulsion system (P) to operate in the helicopter mode.

In an embodiment of the invention, the transmission system (1) comprises the transfer equipment (12) consisting of a continuously variable transmission system.

In an embodiment of the invention, the transmission system (1) comprises:

when the body (2) is in helicopter mode:

the first transfer element (6) which transmits the drive received from the engine (3) to the intermediate transfer element (9), the rotor clutch (16) which is in the active position (A), thus transmitting the engine (3) drive transmitted by the intermediate transfer element (9) to the rotor (4), the rotor (4), first spindle (7) and second spindle (10) that are rotated by the drive transmitted from the intermediate transfer element (9), the first spindle (7) and the second spindle (10), which transmit the drive from the engine (3) to the propulsion system (P) and anti-torque system (T), the closed position (C) in which the clutch (13) is moved by the first actuator (14) and the propulsion system (P) is operated according to the user's input together with the anti-torque system (T), when the body (2) is in aircraft mode:

the rotor clutch (16) moved by the second actuator (17) to be brought to the passive position (K), thereby allowing the engine (3) drive to the rotor (4) to be cut off, the clutch (13) moved by the first actuator (14) and brought to the open position (O), in which only the propulsion system (P) operates.

The invention claimed is:

1. A transmission system (1) comprising a body (2) on an air vehicle; at least one engine (3) that provides a required power for the flight of the body (2); at least one rotor (4) connected to the engine (3) and enabling blades of the air vehicle to rotate; at least one shaft (5) that transmits the movement of the engine (3) to the rotor (4); at least a first transfer element (6) located on the shaft (5); at least a first spindle (7) transmitting the engine (3) drive to the propulsion system (P) and/or anti-torque system (T) that provide movement of the air vehicle; a first spindle element (8) located on the first spindle (7) and allowing the movement of the first spindle (7); an intermediate transfer element (9) that transmits the engine (3) drive from the first transfer element (6) to the first spindle element (8) and rotor (4), a second spindle (10) extending along the direction that the first spindle (7) extends; the second spindle (10) rotating around its own axis independently of the first spindle (7); a second spindle element (11) located on the second spindle (10); a transfer equipment (12) that allows the second spindle (10) to rotate when the first spindle element (8) triggers the second spindle element (11); the first spindle (7) and second spindle (10), one of which drives the propulsion system (P) while the other drives the anti-torque system (T), wherein the second spindle (10) is located in the first spindle (7), or on the first spindle (7) to surround the first spindle (7).

2. A transmission system (1) according to claim 1, wherein at least one clutch (13) on the body (2), which divides the first spindle (7) and the second spindle (10) as a first section (F) and a second section(S), so as to be movable between the first section (F) and the second section(S); a closed position (C) in which the clutch (13) is located in connection with the first section (F) and the second section (S) and allows movement transfer from the first section (F) to the second section(S); an open position (O) in which the clutch (13) is moved from the closed position (C) and the connection between the first section (F) and the second section(S) is broken; at least a first actuator (14) that moves the clutch (13) between the closed position (C) and the open position (O).

3. A transmission system (1) according to claim 2, wherein the anti-torque system (T) for producing anti-torque to the air vehicle for the stability of the air vehicle, to which the second spindle (10) transfers the movement from the engine (3); the propulsion system (P) for providing thrust to the air vehicle, to which the first spindle (7) transfers the movement from the engine (3); the clutch (13) which moves from the closed position (C) to the open position (O) via the first actuator (14), thus preventing the drive to the anti-torque system (T) of the air vehicle to stop the anti-torque system (T).

4. A transmission system (1) according to claim 1, wherein a rotor shaft (15) that transfers movement to the rotor (4), with the intermediate transmission element (9) at one end thereof; a rotor clutch (16) on the rotor shaft (15), which divides the rotor shaft (15) as a first shaft section (B) and a second shaft section (M), so as to be movable between the first shaft section (B) and the second shaft section (M); an active position (A) in which the rotor clutch (16) is located in connection with the first shaft section (B) and the second shaft section (M) and provides movement transfer from the first shaft section (B) to the second shaft section (M), thereby moving the rotor (4); a passive position (K) in which the rotor clutch (16) is moved from the active position (A), and connection between the first shaft section (B) and the second shaft section (M) is broken to stop the movement of the rotor (4); at least a second actuator (17) that moves the rotor clutch (16) between active position (A) and passive position (K).

5. A transmission system (1) according to claim 4, wherein at least one spring (18) on the rotor shaft (15), which is compressed when the second actuator (17) moves the rotor clutch (16) from the active position (A) to the passive position (K) on the rotor shaft (15), wherein when the spring (18) compensates the force of the second actuator (17), it applies a force to the rotor clutch (16) to move rotor clutch (16) from the passive position (K) to the active position (A).

6. A transmission system (1) according to claim 1, wherein a plurality of gears (19) located opposite the first spindle element (8) and the second spindle element (11), transmitting the movement input received from the first spindle element (8) to the second spindle (10), and allowing the first spindle (7) and the second spindle (10) to rotate at different speeds thanks to having different transfer ratios.

7. A transmission system (1) according to claim 4, wherein a control unit (20) which automatically triggers the first actuator (14) and/or second actuator (17) according to a user input or to the flight conditions of the air vehicle, thereby enabling the clutch (13) and/or the rotor clutch (16) to move between the open position (O) and the closed position (C) or between the passive position (K) and the active position (A).

8. A transmission system (1) according to claim 4, wherein a helicopter mode in which the body (2) performs tasks such as vertical take-off and landing, autorotation or hovering; the anti-torque system (T) on the body (2), which creates anti-torque when the body (2) is in helicopter mode; an aircraft mode (A) in which the rotor clutch (16) is brought to the active position (A) to prevent movement input to the rotor (4), the rotor (4) is stopped and the blades are used as fixed wings, as well as placing the clutch (13) in the open position (O) to prevent the anti-torque system (T) from operating; the propulsion system (P) that provides thrust for the movement of the body (2) when the body (2) is in aircraft mode (A).

9. A transmission system (1) according to claim 2, wherein a plurality of protrusions (21) located on the first spindle (7) and/or the second spindle (10); a plurality of recesses (22) located on the clutch (13) so as to be form-compatible with the protrusions (21), wherein the recesses (22) allow the clutch (13) to slide on the protrusions (21) and thus to be located between the open position (O) and the closed position (C).

10. A transmission system (1) according to claim 2, wherein the clutch (13) which is in the closed position (C)

when the body (2) is in helicopter mode, and enables the propulsion system (P) to operate in the helicopter mode.

11. A transmission system (1) according to claim 1, wherein the transfer equipment (12) consisting of a continuously variable transmission system.

12. A transmission system (1) according to claim 4, wherein:

when the body (2) is in helicopter mode:

the first transfer element (6) which transmits the drive received from the engine (3) to the intermediate transfer element (9), the rotor clutch (16) which is in the active position (A), thus transmitting the engine (3) drive transmitted by the intermediate transfer element (9) to the rotor (4), the rotor (4), first spindle (7) and second spindle (10) that are rotated by the drive transmitted from the intermediate transfer element (9), the first spindle (7) and the second spindle (10), which transmit the drive from the engine (3) to the propulsion system (P) and anti-torque system (T), the closed position (C) in which the clutch (13) is moved by the first actuator (14) and the propulsion system (P) is operated according to the user's input together with the anti-torque system (T), when the body (2) is in aircraft mode:

the rotor clutch (16) moved by the second actuator (17) to be brought to the passive position (K), thereby allowing the engine (3) drive to the rotor (4) to be cut off, the clutch (13) moved by the first actuator (14) and brought to the open position (O), in which only the propulsion system (P) operates.

\* \* \* \* \*